Oct. 10, 1944.  F. W. FALCK  2,360,215
ENLARGING CAMERA
Filed June 17, 1939　　2 Sheets-Sheet 1
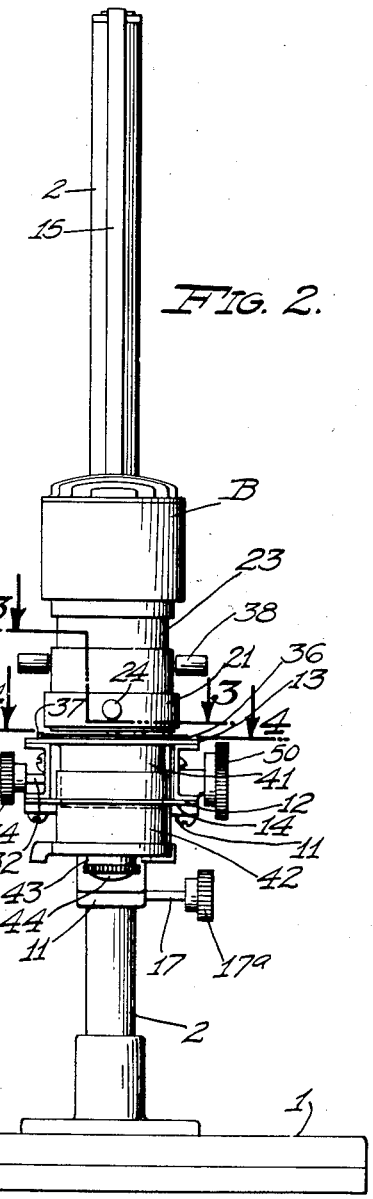
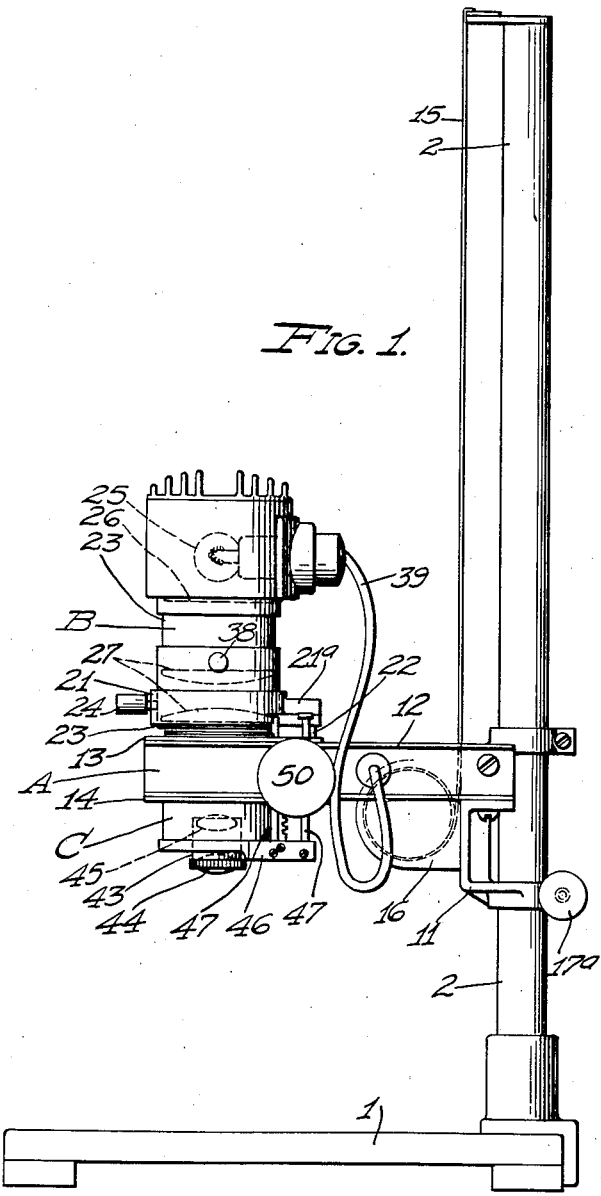
INVENTOR.
F. W. FALCK.
BY
ATTORNEY Oct. 10, 1944.     F. W. FALCK     2,360,215
ENLARGING CAMERA
Filed June 17, 1939     2 Sheets-Sheet 2
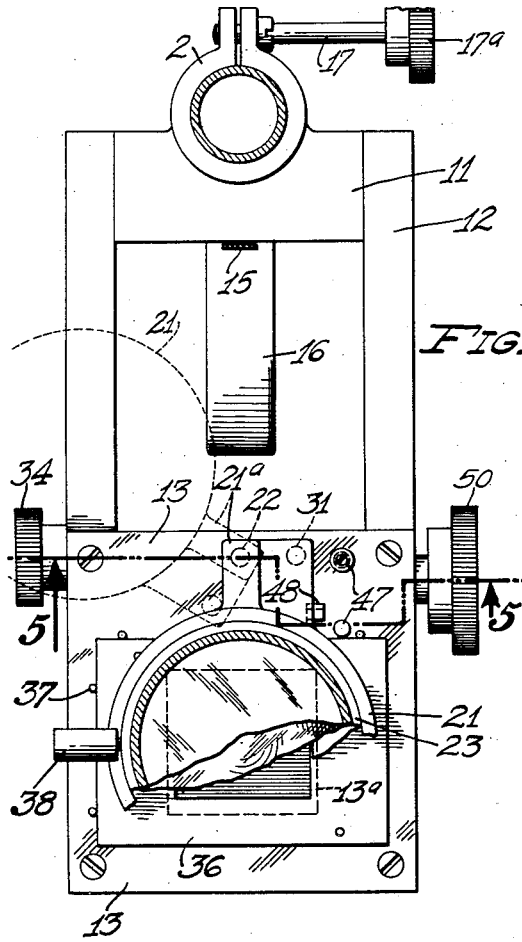
INVENTOR.
F. W. FALCK.
BY
ATTORNEY

UNITED STATES PATENT OFFICE 2,360,215

ENLARGING CAMERA

Fritz W. Falck, Los Angeles, Calif.

Application June 17, 1939, Serial No. 279,672

10 Claims. (Cl. 88—24)

My present invention relates to photographic enlarging projectors or enlarging cameras.

One of the principal objects of this invention is to provide an apparatus of the class in which the light housing or conventionally known lamp house may be readily and manually separated from the magnifying lens or projection lens mechanism for the insertion and location of a photographic negative or plate to be enlarged, or the holder or frame therefor, and which may be readily clamped between said lamp house and lens mechanism.

Another important object of this invention is the provision of apparatus of this class in which the lamp house may be moved axially on and with respect to its support and then swung out of the way or to one side of its normal or focal axis, and in which the latter movement of the lamp house is in addition to or takes place beyond the above adjustment or separation of the lamp house from the lens mechanism for the insertion of the negative or plate.

Also an important object of this invention is the provision of apparatus of this class in which the lamp house with its projection lamp, light diffusing means and condenser lenses may be easily and quickly detached and removed without disturbing other parts of the apparatus.

A further important object of this invention is to provide an apparatus of this class having a novel, rigid, and extremely simple means for axially adjusting the projection lens mechanism for varying the focal distance of the camera.

An object also of this invention is to provide a photographic enlarging projector or enlarging camera which, as a whole, is simple and economical of construction and operation, which is durable, and which will not readily deteriorate or get out of order.

With these and other objects in views, as will appear hereinafter, I have devised a photographic enlarging apparatus, having certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1 is a side elevation of an enlarging camera, incorporating the various features of my invention;

Fig. 2 is a fragmentary front elevation thereof;

Fig. 3 is an enlarged fragmentary section in plan, taken at 3—3 of Fig. 2, and showing by dotted lines the lamp house in a shifted position;

Fig. 4 is another enlarging fragmentary section in plan taken at 4—4 of Fig. 2;

Fig. 5 is a sectional elevation thereof taken through 5—5 of Fig. 3;

Fig. 6 is a fragmentary section taken through 6—6 of Fig. 4 showing the means for axially adjusting the lamp house; and Fig. 7 is a fragmentary section, taken through 7—7 of Fig. 4, showing the means for axially adjusting the projection lens mechanism.

My photographic enlarging projector or camera is mounted on a suitable pedestal which consists of a platform 1 and a tubular column 2 which is secured to and extends upwardly from one side of the platform. The platform is flat and is adapted to support the enlargement or other object.

On the column 2 is slidably mounted, in a vertical direction, a camera support A which consists of a sliding yoke 11, a pair of spaced arms 12, in the form of channels, which extend outwardly from the yoke in a horizontal direction over the platform 1, and a pair of supporting plates 13 and 14 secured to and connecting the outer ends of the channels at the upper and lower sides. The weight of the support just mentioned is carried by a flexible member or strap 15, one end of which is secured to the upper end of the column, and the other end of which extends into a spring housing 16, and is wound on a suitable spring actuated drum located in the housing (not shown). Thus the support is counter-balanced in the conventional manner and thus may be readily raised and lowered. On the slide yoke is provided a tightening screw 17, having a knob 17a at its end, for clamping the yoke about the column in the desired elevated position.

The plates 13 and 14 have openings, designated respectively 13a and 14a, for the transmission of light. Axially aligned with these openings, above the plate 13, is a lamp house B, and below the plate 14 is a projection lens mechanism C.

The lamp house B is removably secured in an annular lamp house carrier 21 which has a rearwardly extending projection 21a and a longitudinally slidable pivot rod 22 extending downwardly from this projection and rotatably through the plates 13 and 14. The lamp house consists of a cylindrical housing 23, the lower end of which extends through the annular carrier 21 and is frictionally secured therein by a set screw or knob 24. The housing 23 preferably extends below the carrier 21 a slight distance, as shown. Within and at the upper end of the housing is a projection lamp 25, with a pre-focusing filament. This lamp house is also provided with the conventional diffusing screen 26 and condenser lenses 27.

The lateral projection 21ª, of the lamp house carrier, is provided with a downwardly extending guide pin 31, which normally extends through the plate 13 and prevents the lamp house from rotating about the pivot rod 22 as long as the pin 31 extends into the plate 13. But when the pin 31 is raised above the upper surface of the plate 13, the lamp house may be pivoted about the pivot rod 22.

I have provided means for raising the lamp house a limited distance for the purpose of inserting a photographic negative or plate between the plate 13 and the lower end of the lamp house. This means consists of a spindle 32 rotatably mounted in a horizontal direction on the support A and provided with a cam 33 at its inner end and a knob 34 at its outer end. The cam 33 is a surface cam and is adapted to engage the underside of a collar 35 secured intermediate the ends of the pivot rod 22. As the knob 34 is rotated, the pivot rod 22, and therefore the lamp house B, is raised the desired distance, but with the guide pin 31 still located in the guide hole within the plate 13.

The photographic negative or plate holder consists, in this instance, of a pair of interlocking rectangular frames 36 between which a negative may be clamped. In this manner, the picture portion of the negative is free from engagement from the holding means. The holder or carrier, consisting of the two rectangular frames, is placed on the upper surface of the plate 13 over the rectangular opening 13ª. The placing of the negative holder in the desired or proper position is facilitated by a plurality of locating pins 37 extending a slight distance upwardly from the plate 13, as shown in Figs. 2, 3, and 4. When the knob 34 is rotated so that the cam 33 is disengaged from the collar 35, that is, when the pivot rod 22 is released, the lamp house B rests directly upon the negative holder 36 and clamps the same against the plate 13. Thus, the lower end of the lamp house is substantially sealed against the upper face of the plate 13.

When the guide pin 31 is raised above the upper surface of the plate 13, the lower end of the guide pin may rest upon the plate and may then be swung about the pivot rod 22, as shown by dotted lines in Fig. 3. To facilitate the raising of the lamp house B, I have provided knobs or handles 38 at the opposite sides of the lower portion of the lamp house, whereby the lamp house may be raised and swung about the pivot rod.

The unscrewing of the said screw or knob 24 permits the lamp house to be raised free of the carrier ring 21. The electric connection or cable 39 for the lamp 25 may be plugged into the side of the support A and may be readily disconnected therefrom. In this manner, the lamp house may be readily removed from the other portion of the apparatus.

The projection lens mechanism C of my apparatus may be axially extended downwardly from the support. This may be effected by telescoping cylindrical members 41 and 42. The member 41 extends downwardly from the plate 13 around the rectangular opening. The cylindrical member 42 extends through the plate 14 and slidably around the member 41. The usual projection lens mechanism 43, consisting of axially spaced lenses 44 and 45, is carried centrally by the cylindrical member 42. The lower end of the member 42 is provided with a laterally extending bracket 46 which is provided with spaced slide rods 47 which extend upwardly through and are guided in the plates 13 and 14. These slide rods are positioned considerably to one side of the axis and outside of the cylindrical member 42 of the lens mechanism so that the slightest weight of the lens mechanism will cause binding of the slide rods 47 in the plates 13 and 14, and thus frictionally hold the lens mechanism in any shifted position. The means for adjusting the lens mechanism vertically consists of a gear rack 48 which extends upwardly from the bracket 46, and a spur gear 49 in mesh with the rack. This gear is rotated by a knob 50 at the outer end of the spindle 51 on which the gear 49 is mounted. The lens mechanism may be readily adjusted by means of this spur gear and rack, but the particular location of the axis of the lens mechanism from the axis of the slide rod is such that the lens mechanism will be fixedly held in the shifted position.

Though I have shown and described a particular construction, combination, and arrangement of parts and portions, I do not wish to be limited to the same, but desire to include in the scope of my invention, the construction, combination, and arrangement, substantially as set forth in the appended claims.

I claim:

1. In an enlarging camera, a support having a light opening, a lamp house pivotally mounted on a vertical axis and extending above the support in such a manner as to be shifted in alignment with the opening or to one side thereof, a projection lens mechanism mounted at the lower portion of the support in such a manner as to be adjusted axially in alignment with the opening, a lens mechanism supporting slide mounted to slide in a path parallel to the axis and spaced from the projection lens mechanism, said slide being secured to the lower end of the lens mechanism and a portion thereof being extensible above the support and above the lower end of the lamp house, the slide being located adjacent but to one side of the pivotal portion of the lamp house, the portion of the slide which extends above the portion of the support lying outside of the path of movement of the lamp house, and means on the support for adjusting the slide with respect to the support.

2. In an enlarging camera, a support comprising vertically spaced apart plates having aligned light openings, a lamp house extending above the support and having a vertical pivot extending through the two plates at one side of the openings, said lamp house being mounted in such a manner on the pivotal axis as to be shiftable in alignment with the openings or to one side thereof, a projection lens mechanism mounted at the lower portion of the support in such a manner as to be adjusted axially in alignment with the opening, a lens mechanism supporting slide mounted to slide in a path parallel to the axis of and spaced laterally from the projection lens mechanism, said slide being secured to the lower end of the lens mechanism and a portion thereof being extensible above both plates and above the lower end of the lamp house, the slide being located adjacent but to one side of the pivotal portion of the lamp house, the portion of the slide which extends above the upper plate lying outside of the path of movement of the lamp house, and means between the plates for adjusting the slide with respect to the support and thereby adjusting the lens mechanism.

3. In an enlarging camera, a support having a light opening, a lamp house having a pivot means extending beyond one end thereof and longitudinally slidably mounted on the support, the axis of said pivot means being arranged parallel to the axis of the lamp house and the pivot portion being positioned to the side of the lamp house, for pivotally shifting the lamp house on the support, a lamp-house-rotation-preventing projection in association with the pivot means and extending longitudinally from the lamp house and laterally from the pivotal axis of the pivot means, the support having a recess capable of receiving the projection, when the axis of the lamp house is aligned with the opening, to prevent swinging of the lamp house about its pivot, and means for temporarily shifting the lamp house longitudinally outwardly from the support, said projection, when the lamp house is shifted from the support, being capable of riding on the support and holding the lamp house in said longitudinally shifted position.

4. In an enlarging camera, a support having a light opening, a lamp house having pivot means extending beyond one end thereof and longitudinally slidably mounted on the support, the axis of said pivot means being arranged parallel to the axis of the lamp house and the pivot portion being positioned to the side of the lamp house, for pivotally shifting the lamp house on the support, a lamp-house-rotation-preventing means in association with and extending laterally from the pivotal axis of the pivot means, the lamp-house-rotation-preventing means interlocking the lamp house and support when the axis of the lamp house is aligned with the opening and the lamp house is shifted towards the support, and means for adjusting the lamp house outwardly from the support to release the lamp-house-rotation-preventing means to permit the lamp house to be swung about its pivotal axis.

5. In an enlarging camera, a support having a light opening, a lamp house movably mounted on the support in such a manner as to have limited axial movement outwardly from the support, means for interlocking the lamp house against lateral movement with respect to the support, and for holding the lamp house in alignment with the light opening, and means for releasing the lamp house from said interlocked position, when the latter is shifted outwardly to said limited extent, to allow free lateral movement of the lamp house in a plane perpendicular to the axis of the lamp house.

6. In an enlarging camera, a support having a light opening, a lamp house movably mounted on the support, means for adjusting the lamp house a fixed distance outwardly with respect to the support in alignment with the light opening, and means for interlocking the lamp house against lateral movement with respect to the support, and for holding the lamp house in alignment with the light opening, until the lamp house is shifted outwardly substantially said fixed distance, said lamp house, when in said outwardly shifted position, being free to move in a plane perpendicular to the axis of the lamp house out of alignment with the opening.

7. In an enlarging camera, a support having a light opening, a lamp house movably mounted on the support, a negative holding frame, means for locating the frame between the support and the lamp house for registering the same with the light opening, means for adjusting the lamp house a fixed distance outwardly with respect to the support in alignment with the light opening, said lamp house clamping said frame against said support when the adjusting means is released, when in alignment with said opening, and means for interlocking the lamp house against a lateral movement with respect to the support, and for holding the lamp house in alignment with the opening. Until the lamp house is adjusted outwardly substantially said fixed distance, said lamp house, when in said outwardly adjusted position, being free to move in a plane perpendicular to the axis of the lamp house out of alignment with the opening.

8. In an enlarging camera, a support having a light opening, a lamp house, pivot means for supporting the lamp house on the support, the pivot means being capable of swinging the lamp house about an axis parallel to the axis of the lamp house and for permitting limited axial movement of the lamp house outwardly with respect to the support, means for interlocking the lamp house against pivotal movement about the axis of the pivot means and for holding the lamp house in alignment with the light opening, and means for releasing the lamp house from said interlocked position, when the lamp house is adjusted outwardly said limited extent, to allow free pivotal movement of the lamp house.

9. In an enlarging camera, a support having a light opening, a lamp house, pivot means for pivotally supporting the lamp house on the support, the axis of the pivot means being parallel to the axis of the lamp house, means for adjusting the lamp house a fixed distance outwardly with respect to the support in the direction of the pivotal axis and in alignment with the light opening, and means for interlocking the lamp house against pivotal movement with respect to the support, and for holding the lamp house in alignment with the light opening, until the lamp house is adjusted outwardly substantially said fixed distance, said lamp house, when in said outwardly adjusted position, being free to move about the pivotal axis and out of alignment with said opening.

10. In an enlarging camera, a support consisting of a pair of spaced supporting plates and a light-transmitting housing depending from the upper plate and extending toward the lower plate, the lower plate having an opening larger than the periphery of the housing, a lens mechanism slidably mounted around the housing and extending through the opening in the lower plate, and means for adjusting the lens mechanism with respect to the housing.

FRITZ W. FALCK.